US008944289B2

(12) United States Patent
Cocchi et al.

(10) Patent No.: US 8,944,289 B2
(45) Date of Patent: Feb. 3, 2015

(54) MACHINE FOR MAKING AND DISPENSING LIQUID, SEMI-LIQUID AND/OR SEMI-SOLID FOOD PRODUCTS

(75) Inventors: Andrea Cocchi, Calderara di Reno (IT); Roberto Lazzarini, Reggio Emilia (IT)

(73) Assignee: Ali S.p.A.—Carpigiani Group (IT)

( * ) Notice: Subject to any disclaimer, the term of this patent is extended or adjusted under 35 U.S.C. 154(b) by 197 days.

(21) Appl. No.: 13/401,505

(22) Filed: Feb. 21, 2012

(65) Prior Publication Data

US 2012/0217264 A1 Aug. 30, 2012

(30) Foreign Application Priority Data

Feb. 28, 2011 (IT) .............................. BO2011A0093

(51) Int. Cl.
| | | |
|---|---|---|
| *B65D 35/56* | (2006.01) | |
| *A23G 9/04* | (2006.01) | |
| *A23G 9/20* | (2006.01) | |
| *A23G 9/28* | (2006.01) | |

(52) U.S. Cl.
CPC .. *A23G 9/04* (2013.01); *A23G 9/20* (2013.01); *A23G 9/28* (2013.01)
USPC ........ 222/105; 222/146.6; 222/190; 222/334; 222/386.5; 222/405; 62/392; 62/399

(58) Field of Classification Search
USPC ............. 62/389–399; 222/95–96, 105, 146.1, 222/146.6, 148–151, 190, 325–327, 334, 222/386.5, 405, 541.2, 40, 57, 63, 71, 222/134–135
See application file for complete search history.

(56) References Cited

U.S. PATENT DOCUMENTS

| | | | | | |
|---|---|---|---|---|---|
| 3,651,989 | A | * | 3/1972 | Westrich | .......................... 222/14 |
| 4,022,031 | A | * | 5/1977 | Calim | ............... 62/66 |
| 5,048,724 | A | * | 9/1991 | Thomas | ........................... 222/95 |
| 5,265,764 | A | * | 11/1993 | Rowe et al. | ..................... 222/95 |
| 5,361,941 | A | * | 11/1994 | Parekh et al. | .................... 222/95 |

(Continued)

FOREIGN PATENT DOCUMENTS

| | | |
|---|---|---|
| CN | 101536806 | 9/2009 |
| CN | 101919483 | 12/2010 |

(Continued)

OTHER PUBLICATIONS

Italian Search Report dated Oct. 19, 2011 from counterpart foreign application.

(Continued)

*Primary Examiner* — Paul R Durand
*Assistant Examiner* — Andrew P Bainbridge
(74) *Attorney, Agent, or Firm* — Timothy J. Klima; Shuttleworth & Ingersoll, PLC

(57) ABSTRACT

A machine for making and dispensing liquid, semi-liquid and/or semi-solid food products comprising a cylinder for processing a mixture of a basic product and air, a chamber for the transit of a heat exchange fluid, the chamber being located around the cylinder, a dispensing tap and means for treating the heat exchange fluid and supplying it to the transit chamber; it is equipped with a flexible container for containing the basic product and housed in a rigid container; a compressor of a flow of pressurized air being designed to send pressurized air into the rigid container in such a way that it acts on the flexible container to cause the transfer of the basic product from the container to the processing cylinder through a feed tube.

20 Claims, 1 Drawing Sheet

(56) References Cited

U.S. PATENT DOCUMENTS

| | | | |
|---|---|---|---|
| 6,092,693 A * | 7/2000 | Powell | 222/59 |
| 6,155,461 A * | 12/2000 | Ishihara et al. | 222/146.6 |
| 6,553,779 B1 * | 4/2003 | Boyer et al. | 62/342 |
| 6,814,262 B1 | 11/2004 | Adams et al. | |
| 6,874,356 B2 * | 4/2005 | Kornfeldt et al. | 73/64.42 |
| 7,741,108 B2 * | 6/2010 | Saxena et al. | 435/288.7 |
| 7,762,102 B2 * | 7/2010 | Hamel et al. | 62/443 |
| 8,087,544 B2 * | 1/2012 | Elsom et al. | 222/57 |
| 8,360,278 B2 * | 1/2013 | Fiedler | 222/95 |
| 8,463,447 B2 * | 6/2013 | Newman et al. | 700/283 |
| 8,739,565 B2 | 6/2014 | Cocchi et al. | |
| 2008/0047973 A1 * | 2/2008 | Elsom et al. | 222/57 |
| 2009/0321335 A1 * | 12/2009 | Siemer et al. | 210/175 |
| 2010/0101235 A1 | 4/2010 | Cocchi et al. | |
| 2011/0011887 A1 * | 1/2011 | Zaniboni et al. | 222/23 |
| 2012/0251697 A1 * | 10/2012 | Cocchi et al. | 426/521 |

FOREIGN PATENT DOCUMENTS

| | | |
|---|---|---|
| CN | 201709345 | 1/2011 |
| EP | 0579051 | 1/1994 |
| EP | 2151168 | 2/2010 |
| EP | 2255673 | 12/2010 |
| WO | 02/102170 | 12/2002 |
| WO | 2004/026756 | 4/2004 |
| WO | 2004/054380 | 7/2004 |

OTHER PUBLICATIONS

Chinese Office Action dated Jun. 11, 2014 from counterpart application No. 201210103130.9.

* cited by examiner

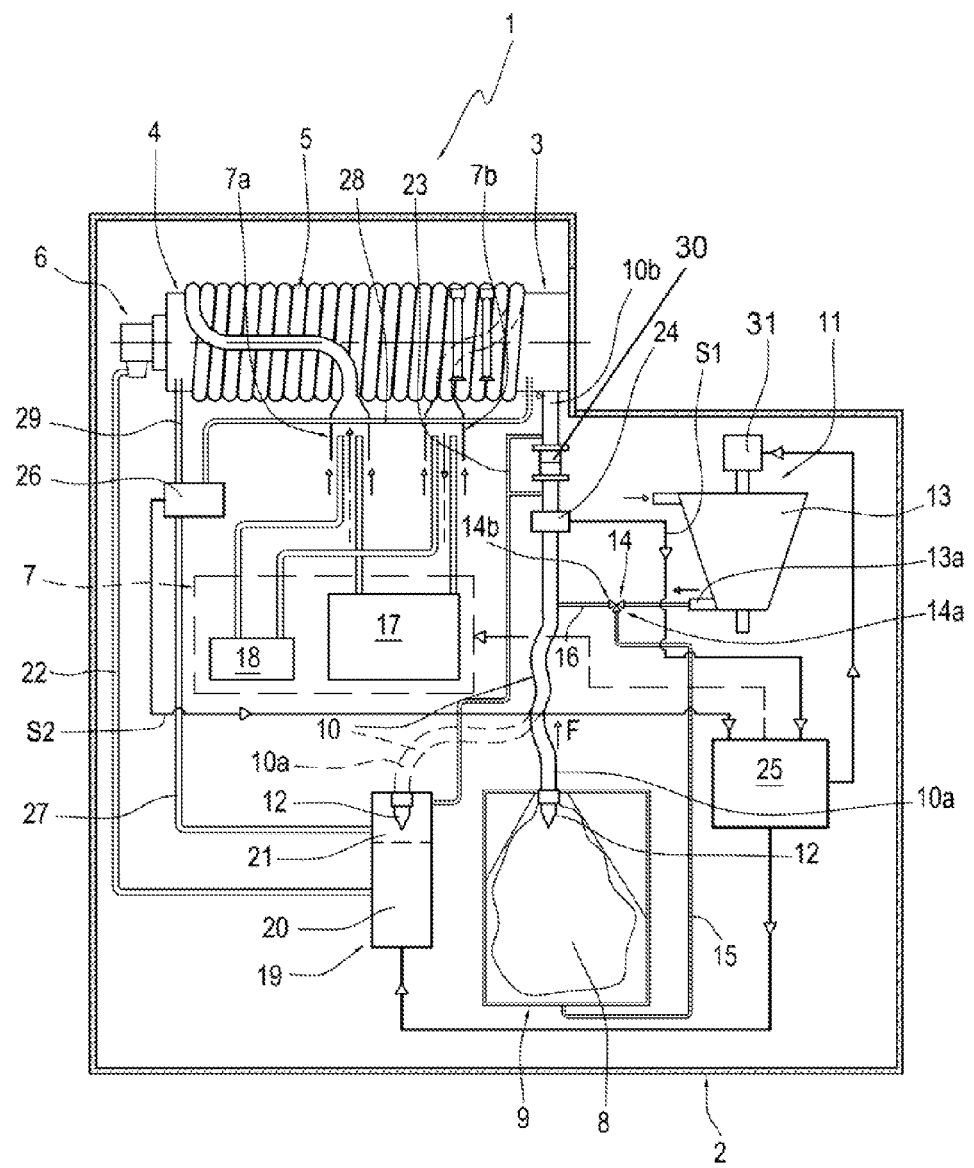

MACHINE FOR MAKING AND DISPENSING LIQUID, SEMI-LIQUID AND/OR SEMI-SOLID FOOD PRODUCTS

This application claims priority to Italian Patent Application BO2011A000093 filed Feb. 28, 2011, the entirety of which is incorporated by reference herein.

BACKGROUND OF THE INVENTION

The present invention relates to a machine for making and dispensing liquid, semi-liquid and/or semi-solid food products, such as for example soft ice cream and the like.

In particular, the present invention relates to machines for making ice cream in which the basic product for making the ice cream is contained in sealed containers made with soft plastic material enclosed in cardboard boxes, commonly known under the name "Bag in Box".

Machines for making and dispensing ice creams of this type comprise a supporting frame at the top of which is an operating unit for making and dispensing ice cream.

The operating unit comprises a cooling cylinder, commonly called ice cream machine, in which the basic product is processed, which, once ready, may be extracted by a dispensing tap usually located on the front part of the machine frame.

These machines also comprise a pump for sucking the basic product from the sealed container, and the pump inputs the basic product into the ice cream machine through a suction tube.

A first drawback of machines of this type derives from the fact that the suction pump has a pulsed type of operation and as a result, is not capable of ensuring a continuous delivery flow rate. Furthermore, there is the drawback of exerting a mechanical action on the food fluid resulting in potential deterioration of the basic product.

A further drawback of these machines is associated with the fact that the basic product consists of a food mixture, for example milk-based, which perishes easily and consequently may quickly result in the formation of microbial and bacterial contamination, in particular at the parts which are directly in contact with the basic product.

For example, if the suction tube is considered, which normally has a needle or tip for perforating the container at the connecting end with the sealed container, during the change of an emptied container, the needle comes into contact with air and the surrounding ambient, resulting in possible contamination of bacterial nature, with the risk of contaminating the basic product in the successive container.

These machines are therefore subjected to frequent checks and preventive maintenance to ensure perfect hygienic conditions are kept along the entire food circuit mentioned. However, interventions of this type are not capable of ensuring the complete hygienic aspect of the product.

Although methods exist for estimating the number of colonies in a bacterial population, these methods require laboratory analyses, high costs, very long times, and they are only applied to perform random checks, for example in the dairy sector.

SUMMARY OF THE INVENTION

Thus the object of the present invention is to make a machine for making and dispensing liquid, semi-liquid and/or semi-solid food products, which overcomes the above-mentioned drawbacks in machines of known type.

These and other aims are all achieved by the present invention relating to a machine comprising the technical features detailed in one or more of the appended claims.

BRIEF DESCRIPTION OF THE DRAWINGS

Further characteristics and advantages of the invention are apparent from the detailed description which follows, with reference to the accompanying drawings, which illustrate preferred embodiments of the invention by way of example and in which:

FIG. 1 is a view of the machine disclosed by the present invention.

DESCRIPTION OF THE PREFERRED EMBODIMENTS

With reference to the FIGURE above, numeral 1 indicates, in its entirety, a machine for making and dispensing liquid, semi-liquid and/or semi-solid food products, comprising a frame 2 supporting an operating unit 3 for processing a mixture of a basic fluid and air, for making and dispensing said products. The operating unit comprises a processing cylinder or ice cream machine cylinder 4 for the mixture, a chamber 5 for the transit of a heat exchange fluid, the chamber being located around the cylinder, a dispensing tap 6 and means 7 for treating the heat exchange fluid and supplying it to the transit chamber 5, with an inlet 7a and an outlet 7b for the heat exchange fluid.

The machine further comprises a flexible or soft container 8 for containing the basic product and housed inside a rigid container 9. The unit consisting of the soft container 8 and the rigid container 9 is generally known under the name "Bag in Box".

A duct 10 for feeding the basic product to the processing cylinder connects the soft container 8 to the ice cream machine cylinder 4.

There are means 11 for generating a flow of pressurized air designed to send pressurized air into the rigid container 9 so as to act on the flexible container 8 to cause the transfer of the basic product from the container 8 to the processing cylinder 4.

In particular, the means 11 for generating the flow of pressurized air cause a compression of the flexible container 8, thus forcing the basic product out through the feed duct 10 until it reaches the ice cream machine cylinder 4.

The feed duct 10 comprises a first and a second portion, indicated with 10a and 10b respectively, connected to each other by a separable connector 30. In particular, the first portion 10a is connected to the flexible container 8, while the second portion 10b is connected to the cylinder 4.

The first portion 10a has means 12 for perforating the container 8 at the connection end with the flexible container. Advantageously, these perforating means comprise a needle or tip 12 designed to perforate the container 8 and to allow the basic product to be input into the feed tube 10.

In the preferred embodiment, the means 11 for generating pressurized fluid are in the form of a motor-driven compressor, comprising a compressor 13 and a motor 31 connected to the rotating shaft of the rotor (not shown). In an alternative embodiment, the means for generating the fluid may be in the form of pneumatic equipment.

Generally, there is a blade mixer (not shown in the FIGURE) inside the ice cream machine cylinder 4, the mixer mixing the basic product with the air possibly contained inside the cylinder 4.

Advantageously, it is possible to add air to the basic product before it reaches the ice cream machine cylinder 4. Thus, it is possible to check the mixture and therefore the proportions of basic product and air.

In particular, the FIGURE shows that it is possible to connect the motor-driven compressor to the feed tube 10.

At the outlet, the motor-driven compressor has a first outlet duct 13a connected to a 3-way valve 14, which is connected to a first delivery 14a with a duct 15 in communication with the rigid container of the basic product and a second delivery 14b with a third duct 16 in communication with the duct 10 for feeding the basic product.

Thus, a first fraction of the flow of pressurized air generated by the motor-driven compressor is sent to the rigid container 9 to compress the flexible container 8, while a second fraction of the flow, preferably smaller, is sent to the feed tube 10 to obtain the mixture input into the ice cream machine cylinder 4.

The means 7 for treating and supplying the heat exchange fluid, schematically indicated in its entirety as a block 7 defined by a broken line, comprise, in the preferred embodiment, a refrigerating circuit 17 for generating a fluid for cooling the mixture in the processing cylinder 4 and a heater 18 for generating a fluid for heating the mixture.

In particular, the inlet and the outlet of the refrigerating circuit 17 are connected to the inlet and to the outlet, respectively, of the transit chamber 5. The same holds true for the inlet and the outlet of the heater.

The refrigerating circuit 17, of a known type, generally comprises a motor-driven compressor, a condenser and a network of tubings, in which the cooling fluid flows, while the evaporator is represented by the chamber 5.

The heater 18 may comprise a boiler and a related circuit, in which a heating fluid flows. Advantageously, the heating fluid may comprise air or water.

Advantageously, the refrigerating circuit 17 and the heater 18 may consist of a reversible thermodynamic cycle heat engine.

The machine 1 further comprises sanitizing means 19 for cleaning and sanitizing some devices and components on machine 1, which come into contact with the basic product or the food mixture.

These means serve the purpose of cleaning and eliminating any residual basic product and/or mixture remaining inside the various components. For example, it is suitable to eliminate the residual product inside the ice cream machine cylinder 4 before starting a new production cycle.

Product may also remain inside the feed duct or tube 10, which by coming into contact with air, may deteriorate and contaminate the successive production.

For this reason, it is advantageously useful to clean the various components with a sanitizing fluid generated and distributed by the sanitizing means 19. Preferably, the fluid may comprise steam with a high water content, as steam is easy to create and moreover, it has the possibility of flowing through the various ducts more easily; while the high water content particularly allows the ice cream machine cylinder 4 to be properly cleaned again, thus avoiding the formation of channels within the residual product, which would cause the steam to leak thus cancelling its cleaning action.

Alternatively, it is possible to use water containing a low-foam mild detergent as a sanitizing fluid.

These sanitizing means, schematically shown in the FIGURE by block 19, comprise a sanitizing fluid generator 20 and a sanitizing chamber 21.

The sanitizing fluid generator 20 comprises a boiler for creating steam not shown here or described in detail because it is of a known type.

The sanitizing chamber 21 is substantially in the form of a chamber for receiving components to be sterilized and also tubings for delivering the sanitizing fluid leaving from it, to the components involved. In particular, the chamber 21 is designed to receive the means 12 for perforating the flexible container 8.

In particular, during the step of changing the container 8 of finished basic product, the feed tube 10 is disconnected from the flexible container and from the perforating means 12. To prevent the contact, albeit brief, with the air from triggering the formation of bacteria, the tube 10 and the perforating means 12 in particular are introduced into the sanitizing chamber 21.

Given that it is directly connected to the generator 21, the chamber fills with sanitizing fluid, in the preferred case, with steam. As the perforating means 12, and therefore the needle they are provided with, come into contact with steam at a high temperature, they are sterilized thus eliminating any possible presence of formed bacteria. The perforating means and the needle may advantageously remain inside the chamber as long as it is not possible to insert them into a new flexible container. Likewise, it is also advantageous that the perforating means remain in contact with the sterilizing fluid for a preset period of time, so as to ensure proper sanitization.

The sanitizing means 19 are mainly designed to clean the ice cream machine cylinder 4 by inputting fluid through the feed tube 10. Preferably, said means are designed to only sanitize the processing cylinder 4. It is however advantageous to be able to equip the sanitizing means and in particular the chamber 21 with the mentioned delivery tubings, indicated with the numerals 22 and 23, so as to be able to sanitize and clean the desired components. For example, it is possible to connect, by means of tube, to the sanitizing chamber and the dispensing tap so as to clean it thoroughly when it is deemed appropriate. Moreover, in the case in which only the tube 10 is to be sanitized without inputting fluid into the cylinder 4, the tubing 23 may be used which may lead both to the portion of tube 10a and to the portion of tube 10b.

The machine is also equipped with a sensor 24 for checking the flow rate of the basic product sent to the processing cylinder 4.

The sensor 24 is preferably mounted on the second portion 10b of the feed tube 10 and allows the flow rate of basic product or mixture, which is flowing in the tube, to be measured.

In the preferred embodiment, the sensor 24 is mounted downstream of the third duct 16, with respect to the feed direction F of the product which reaches the cylinder 4, of means 11 for generating the flow of pressurized air. Thus the sensor 24 examines the mass flow rate of mixture of basic product and air transiting through the portion. Alternatively, it is possible to position the sensor upstream of the third duct so as to only check the flow rate of the basic product.

The sensor 24 may advantageously be a flow rate sensor; alternatively it may be in the form of a pressure sensor.

If a flow rate sensor is used, it is preferably mounted inside the duct.

Alternatively, if a pressure sensor is used, it is mounted outside the duct. In particular however, there is a need to mount the pressure sensor at a stretch of flexible material of the duct.

The duct or tube 10 may consist of rigid material, of a flexible material or of both. Advantageously, if a pressure sensor is used, it may be convenient to make a stretch of duct made from flexible material with sufficient dimensions for optimal operation of the sensor.

The sensor 24 measures the flow rate of fluid by providing an outlet signal S1 indicating the entity of the flow rate.

The signal is then sent to a check and control unit 25 which re-processes the signal to ensure proper operation is complied with. More precisely, based on the information content of the signal S1, the unit 25 adjusts the flow rate of basic product by adjusting the means 11 for generating the flow of pressurized air.

The check and control unit 25 is connected to the motor 14 and adjusts the its speed according to the value of the flow rate supplied, advantageously in real time, by the sensor 24. By adjusting the motor-driven compressor, the unit adjusts the pressure acting on the flexible container 8 and consequently, the flow rate of basic product through the feed duct 10.

Furthermore, if the sensor 24 provides the unit 25 with information relating to the mixture flow rate, the unit 25 is also capable of adjusting the ratio between the basic product and the mixture. More precisely, by adjusting the motor-driven compressor, the unit 25 is also capable of checking the supply of air which is fed into the tubing 10, thus also advantageously providing a check of the mixture fed into the ice cream machine cylinder 4.

Preferably, the adjusting occurs with constant feeding of air and variable feeding of basic product.

The machine 1 also comprises a device 26 for checking the bacterial load contained in the processing cylinder 4.

According to that mentioned above, cleaning the machine 1 and its components, in particular the processing cylinder 4, may occur according to a schedule of preventive maintenance operations, performed at regular intervals.

However, routine maintenance schedules do not ensure proper abatement of a possible bacterial load. This is because the type of sample testing needed to estimate the bacterial population of a mixture takes too long and is not therefore compatible with efficient operation of the machine.

It is therefore advantageous to equip the machine with a device 26 for quickly checking the bacterial load of the mixture.

The device 26 is of known type and is the object of a previous Italian patent application by the same applicant, no. BO2010A000233 (U.S. patent application Ser. No. 13/046, 401), which is hereby incorporated by reference and therefore is not described in detail herein.

The device 26 comprises an inlet and an outlet connected to a first and to a second end, respectively, of the cylinder 4.

Generally, these types of devices provide an analysis of the bacterial load by analyzing the product transiting through them. For this reason, according to the embodiment illustrated, the device is connected to the processing cylinder by two ducts 28 and 29.

In particular, the feed duct 28 picks a small portion of mixture, preferably with continuous operation, and introduces it into an analysis chamber (not shown) of the device.

The mixture flow is analyzed inside the analysis chamber and once the checks are completed, it is returned the cylinder.

According to the information collected on the bacterial load contained in the mixture, the device 26 generates a signal S2 containing this information and sends it to the check and control unit 25.

Preferably, the signal S2 defines a first parameter indicating the bacterial load contained in the mixture. The unit 25 compares the first parameter with a second preset safety parameter according to the bacterial load value deemed acceptable, and then adjusts the means for supplying heat exchange fluid according to the results of the comparison.

If the first parameter is greater than the second safety parameter, the unit 25 issues a command to the heater 18 of the supply means 7 to heat the mixture contained in the cylinder 4, so as to reduce the bacterial load by pasteurization of the mixture.

Likewise, if the first parameter is less than the second safety parameter, the unit 25 issues a command to the refrigerating circuit 17 to cool the mixture so as to cream the mixture and continue with production.

Advantageously, the checking device 26 may be connected, by a connecting duct 27, to the sanitizing means 19, in particular to the sanitizing chamber 21. More precisely, the check and control unit 25 also adjusts the cleaning of the device 26 by issuing a command to the sanitizing means 19, which send the sanitizing fluid to the device 26 through the connecting duct 27.

If, following the above-described operations, the first parameter is still greater than the second safety parameter, the unit 25 issues a command to the sanitizing means 19 to clean and sanitize the devices and components of the machine 1 which come into contact with the basic product or the food mixture.

If, following the above-described operations, the first parameter is again greater than the second safety parameter, the unit 25 issues a command to block the machine 1.

What is claimed is:

1. A machine for making and dispensing at least one chosen from liquid, semi-liquid and semi-solid food products comprising an operating unit comprising:
    a processing cylinder for processing a mixture of a basic product and air,
    a transit chamber for the transit of a heat exchange fluid, the chamber being located around the cylinder,
    a dispensing tap,
    a check and control unit, and
    a mechanism for treating the heat exchange fluid and supplying the heat exchange fluid to the transit chamber; comprising:
    a flexible container for containing the basic product,
    a rigid container housing the flexible container;
    a feed duct for feeding the basic product to the processing cylinder,
    a mechanism for generating a flow of pressurized air, the mechanism constructed and arranged to send pressurized air into the rigid container to act on the flexible container to cause transfer of the basic product from the flexible container to the processing cylinder;
    a sensor, mounted along the feed duct, constructed and arranged to define and send a signal indicating a mixture flow rate to the check and control unit; the check and control unit acting on the mechanism for generating the flow of pressurized air according to the mixture flow rate measured by the sensor to adjust a pressure of the flow of pressurized air acting on the flexible container to regulate a flow rate of the basic product through the feed duct.

2. The machine according to claim 1, wherein the mechanism for generating the flow of pressurized air causes compression of the flexible container.

3. The machine according to claim 2, wherein the feed duct comprises a first and a second portion which are connected to each other by a separable connector; the first portion being connected to the flexible container and the second portion being connected to the processing cylinder.

4. The machine according to claim 3, wherein the sensor is a flow rate sensor.

5. The machine according to claim 4, wherein the flow rate sensor is mounted inside the first portion of the feed duct.

6. The machine according to claim 3, wherein the sensor is a pressure sensor.

7. The machine according to claim 6, wherein the pressure sensor is mounted outside the first portion of the feed duct at a stretch of flexible material of said first portion.

8. The machine according to claim 7, wherein the mechanism for treating the heat exchange fluid comprises a refrigerating circuit, for generating a fluid for cooling the mixture in the processing cylinder, and a heater, for generating a fluid for heating said mixture.

9. The machine according to claim 8, comprising a device for checking a bacterial load of the mixture contained in the processing cylinder.

10. The machine according to claim 9, wherein the device for checking the bacterial load sends a signal, to the check and control unit, the signal defining a first parameter indicating the bacterial load of the mixture; the unit adjusting the mechanism for treating the heat exchange fluid according to a comparison of the first parameter with a second, preset safety parameter.

11. The machine according to claim 10, wherein, the check and control unit is constructed and arranged such that if the first parameter is greater than the second, safety parameter, the check and control unit issues a command to the heater to heat the mixture contained in the processing cylinder, thus reducing the bacterial load by pasteurization of the mixture; and if the first parameter is less than the second, safety parameter, the check and control unit issues a command to the refrigerating circuit to cool the mixture.

12. The machine according to claim 1, comprising a sanitizing mechanism.

13. The machine according to claim 12, wherein the sanitizing mechanism comprises a sanitizing fluid generator.

14. The machine according to claim 13, wherein the sanitizing mechanism sanitizes the processing cylinder by inputting sanitizing fluid into the cylinder through the feed duct.

15. The machine according to claim 13, comprising a device for checking the bacterial load of the mixture contained in the processing cylinder, wherein the sanitizing mechanism sanitizes the device for checking the bacterial load by inputting sanitizing fluid through a duct connected to the sanitizing mechanism.

16. The machine according to claim 13, wherein the sanitizing fluid comprises steam with a high water content.

17. The machine according to claim 13, wherein the sanitizing fluid comprises water containing a low foam mild detergent.

18. The machine according to claim 1, wherein the mechanism for generating the pressurized fluid includes a motor-driven compressor.

19. The machine according to claim 1, wherein the mechanism for generating the pressurized fluid includes pneumatic equipment pressurizing the fluid.

20. The machine according to claim 1, wherein the mechanism for generating the flow of pressurized air is constructed and arranged to send pressurized air into the feed duct and the check and control unit acts on the mechanism for generating the flow of pressurized air according to the mixture flow rate value measured by the sensor to adjust a pressure of the flow of pressurized air into the feed duct to regulate a flow rate of the basic product through the feed duct.

* * * * *